3,152,995
PROCESS FOR INCREASING THE BRIGHTNESS OF ELECTROLUMINESCENT PHOSPHORS
Lester W. Strock, Salem, Mass., assignor to Sylvania Electric Products Inc., a corporation of Delaware
No Drawing. Filed July 12, 1960, Ser. No. 42,228
3 Claims. (Cl. 252—301.6)

This invention relates to electroluminescent phosphors and to processes for preparing them. Electroluminescent phosphors are substances which will emit light upon the application of a suitable field, especially a varying field, and are usually in the form of crystalline substances, generally in powdered condition.

The phosphors used in fluorescent lamps or cathode ray tubes do not ordinarily give any appreciable electroluminescence. Some change in the phosphor composition or treatment seems necessary, for example an increase in the copper content, if the phosphor is copper-activated zinc sulfide, and generally also some other change such as the addition of a lead salt or a refiring after adding additional copper. In the latter case, the ingredients are generally fired first at a temperature of about 1200° C. with enough copper salt to produce a fluorescent phosphor, and then, after the addition of more copper salt, refired at a lower temperature of about 800° C. The copper salt is added either by dry mixing or from solution, and after firing there will be an excess of copper formed which is removed by washing in potassium cyanide, an operation which requires extreme caution in production use due to the deadly nature of the cyanide.

It would seem that to make a phosphor electroluminescent, some structural disorder is necessary in addition to the activation sufficient for fluorescence.

In zinc sulfide, for example, the zinc atom normally forms a tetrahedral bond with its neighboring sulfur atom, and the atoms of sulfur form tetrahedral bonds with the surrounding zinc atoms. I have found that treatments which tend to produce broken tetrahedral bonds in the zinc crystal, are effective in making a non-electroluminescent zinc sulfide phosphor electroluminescent. The broken bond may involve isolated atom pairs or an entire plane, say the so-called "001" plane, of the crystal, assuming the crystal to be hexagonal, or in a corresponding plane in a cubic crystal.

At the crystal surface all tetrahedral bonds are not used as in the crystal interior and are available for bonding with atoms or ions as surface layers which also play a role in luminescence. The broken bonds may appear in the crystal after milling or working, and treatment of the worked material with oxygen, or with an oxygen-containing gas such as air, will apparently enable the oxygen to combine with at least some of the surface sulfur atoms, thereby removing surface sulfur as $SO_2$ and leaving an excess of zinc atoms on the surface, which will migrate to combine with the broken bonds of sulfur within the crystal.

This provides an essentially different crystal than those formed by the addition of a copper salt between the two firings, since there will be an excess of zinc atoms rather than additional copper atoms. As a result, the new phosphor has many advantages, which are pointed out below.

For example, by treating the crystal in a manner which tends to produce such disorders, I have been able to produce electroluminescent phosphors by new processes and to produce some which are brighter, even at 60 cycles per second, than those produced by prior methods, and to make them with greater thermal stability.

At high frequencies, my new phosphors have an even greater improvement in brightness, for example a brightness three or four times as high as previous phosphors at 3000 cycles per second.

Moreover, although my phosphors are produced by a double firing method, they do not use excessive copper and hence require no cyanide wash, and some require no wash at all, but are electroluminescent immediately upon being cooled after firing.

In addition, the firing and cooling time with my new process is only about half an hour, which is a considerable reduction from the 20 hours often required with other methods. This enormous reduction in the firing and cooling period saves not only time but also money and allows the production of a less costly phosphor.

The method which I use in making my invention is to first fire a zinc sulphide phosphor at a high temperature, say 1200° C., with a copper activator and a coactivator, for example, a halogen, in order to form a photoluminescent phosphor, that is a phosphor which fluoresces when irradiated with visible light. The amount of copper activator used is greater than that normally used for a photoluminescent phosphor, and may preferably be about 0.1% by weight, or between about 0.024% and 0.15% by weight, of the zinc sulphide.

The resultant phosphor will not be electroluminescent, and to make it so requires an additional activating step. This step may be the reheating of the phosphor to 450° C. in a vacuum and exposure to air or oxygen while cooling, or refiring at a temperature between about 300° C. and 800° C. after adding metal oxides, for example, $TiO_2$, $Al_2O_3$, ZnO, MgO, $BaO_2$, $ZrO_2$ and $SnO_2$. These may be heated in a closed tube or vacuum, but exposure to air while cooling gives some improvement.

Instead of the above, the additional step may instead be heating the material with a suitable chloride at a temperature between about 300° C. and 800° C. preferably at 450° or 550° C. and then activating the phosphor by exposure to air or oxygen during cooling from the firing. In each case, milling or some other means of reworking the crystal, such as driving the starting material against a hard surface with an air blast, is necessary between the initial firing at, say, 1200° C. and the second or lower temperature firing at about 450° C.

I have also discovered that an electroluminescent phosphor will completely lose its electroluminescent properties and become non-electroluminescent if heated to about 400° C. after being mixed with a chloride. However, on subsequent heating to a higher temperature, e.g., 550° C. in air, or in vacuum with exposure to air or oxygen while cooling, it will generally become even more brightly electroluminescent than before, in fact as much as 40% brighter. Moreover, no milling is required by this reactivation, whereas on using a non-electroluminescent sulfide phosphor as the starting material milling is required before heating in a vacuum and exposure to oxygen.

For the above it is clear that the deactivation by the chloride is purely chemical, since the activation can be restored by purely thermal or by chemical means. In the phosphors which have not first been deactivated before treatment, the effect is partly physical because milling seems to be required to expose fresh surfaces, and a physical reworking appears to be involved.

The deactivation step may be achieved by any chloride which melts or volatilizes at temperatures below about 400° C., e.g., $ZnCl_2$, $SnCl_2$, $NH_4Cl$, etc. In fact bromides are more effective deactivating agents while iodides are less so. Low melting or gaseous sulfides and oxides also have been used as deactivating agents, as have nitrogen and chlorine. In all these cases the non-metallic element of the deactivating agent (e.g., Cl, Br, I, S, N, O) apparently enters the EL-phosphor crystal, combines with the broken bond of the EL-center and prevents its functioning as an emitter of light under an electric field. The temperature at which maximum deactivation occurs depends on the deactivating elements but is usually between 300° C. and 400° C. (close to 400° for Cl and to 300° for S). In most cases, the deactivating combination is destroyed by thermal treatment in the temperature range 500°–600° C., but if the phosphor is to be heated in the 400°–500° C. range on subsequent treatment in a lamp, with out subsequent heating above that range, the elimination or reduction in amount of those substances which are deactivating agents in the phosphor, can be quite important.

In one example of a phosphor according to my invention, I begin with a crystallized hexagonal copper-activated zinc sulfide containing about 0.06% by weight of copper and a similar amount of chlorine. The material has been formed by heating 3000 grams of zinc sulfide with 45 grams of copper sulfate and 270 grams of a triple chloride flux containing equal amounts of sodium, magnesium and barium chloride. The heating is effected at about 1100° C., but can be varied from about 1050° C. to 1200° C. After firing and cooling, the phosphor is washed in water to dissolve out any excess water-soluble chlorides.

The resultant phosphor, which is fluorescent but non-electroluminescent, is then milled in a ball mill to partially fracture the particles and give a satisfactory particle size of about 30 microns, although it can vary from 5 microns to 100 microns. The milling time is critical and is mainly to disorder rather than fracture, and for a 20 gm. charge should be from 5 min. to 50 min., with 20 min. being preferred. Instead of milling, the phosphor can be impacted against a hard surface by an air stream, the pressure of the stream being between about 10 pounds per square inch and 100 pounds per square inch, a value of about 45 pounds per square inch being generally satisfactory. The treatment with the air stream need only last one or two minutes.

The worked material is then heated in a vacuum to a temperature above 250° C. but not greater than 800° C., preferably about 450° C. This apparently removes all absorbed gases and also prevents oxidation before the crystal is cleaned by heating. A controlled amount of oxygen is then added, either as pure oxygen or as an oxygen-containing gas mixture such as air. The amount of oxygen used can be enough to provide between one-half a monomolecular layer and 100 such layers, with best results generally occurring at about 1 monomolecular layer. The phosphor can then be used without any washing at all, and will have a brightness at 60 cycles per second equal to or better than that of the phosphors which require cyanide washing, and will have a much greater brightness at higher frequencies.

Instead of being treated with gaseous oxygen, the copper-activated zinc sulfide can be mechanically mixed, for example by milling, with about 1% to 25% or even higher, but preferably about 10%, of a suitable oxide such as $ZnO$, $Al_2O_3$, $TiO_2$, $ZrO_2$, $SiO_2$, $GeO_2$, $In_2O_3$, $MgO$, or $BaO_2$, etc. The oxide should be of a light color, and dark oxides such as $PbO$ should be avoided.

The materials can then be heated to about 450° C. in vacuum, but if desired, a small amount of oxygen can be added to the atmosphere during cooling.

In one example of a phosphor fired in an atmosphere of oxygen according to the invention, with a phosphor charge of 10 to 30 grams, oxygen was flowed over the phosphor at a rate of 10 liters per minute after the phosphor was brought up to a temperature of about 450° C. The oxygen flow was maintained for 40 minutes of heating, then for the 15 minutes required for the phosphor to cool. The phosphor charge was between 10 and 30 grams, and the chamber in which the phosphor was placed, and through which the oxygen flowed, was of about 1½ liters volume.

If desired, the starting phosphor can be mixed with chlorides instead of oxides, milled, heated to about 400° C., a temperature between 350° and 800° C., preferably 550° C., and then exposed to oxygen during cooling, in the amount previously stated. The amount of chloride used can vary from 10% to 25% but is preferably about 10% by weight of zinc sulfide, and suitable chlorides are $ZnCl_2$, $LiCl$, $NaCl$, $MgCl_2$, $SnCl_2$, and the like, including $NH_4Cl$. When the latter is used, the sulfur atoms which vaporize away do so as $H_2S$ rather than as $SO_2$.

What I claim is:

1. The process of increasing the emission brightness of a copper-activated zinc sulfide electroluminescent phosphor, said process comprising the steps of adding a chloride to said phosphor, heating to about 400° C., and then exposing the phosphor at a higher temperature below 800° C. to a source of oxygen.

2. The process of increasing the emission brightness of a copper-activated zinc sulfide electroluminescent phosphor, said process comprising the steps of adding a chloride to said phosphor, heating to about 400° C., and then exposing the phosphor at a temperature between 500° C. to 600° C., to a source of oxygen.

3. The process of increasing the emission brightness of a copper-activated zinc sulfide electroluminescent phosphor, said process comprising the steps of adding a chloride to said phosphor, heating to about 400° C., evacuating the region around the phosphor, and then exposing the phosphor at a temperature between about 500° C. to 600° C., to a source of oxygen.

References Cited in the file of this patent

UNITED STATES PATENTS

| | | |
|---|---|---|
| 2,950,257 | Froelich | Aug. 23, 1960 |
| 2,957,830 | Goldberg et al. | Oct. 25, 1960 |

FOREIGN PATENTS

| | | |
|---|---|---|
| 526,180 | Belgium | Aug. 2, 1954 |
| 745,860 | Great Britain | Mar. 7, 1956 |